(12) United States Patent
Arecco et al.

(10) Patent No.: US 6,804,463 B1
(45) Date of Patent: Oct. 12, 2004

(54) CONNECTION VERIFICATION FOR ALL-OPTICAL CROSS-CONNECTS BY SIGNAL CROSS-CORRELATION

(75) Inventors: Fulvio Arecco, Monza (IT); Valerio Viscardi, Paderno Dugnano (IT); Giacomo Losio, Tortona (IT)

(73) Assignee: Cisco Technology, Inc., San Jose, CA (US)

( * ) Notice: Subject to any disclaimer, the term of this patent is extended or adjusted under 35 U.S.C. 154(b) by 560 days.

(21) Appl. No.: 09/823,036

(22) Filed: Mar. 29, 2001

(51) Int. Cl.$^7$ .............................................. H04B 10/00
(52) U.S. Cl. ............................. 398/19; 398/17; 398/16; 398/25
(58) Field of Search ............................. 398/19, 82, 25, 398/9, 17, 79, 12, 34, 15, 16, 45; 330/129

(56) References Cited

U.S. PATENT DOCUMENTS

| | | | |
|---|---|---|---|
| 6,005,695 A | * | 12/1999 | Roberts ........................ 398/25 |
| 6,243,507 B1 | | 6/2001 | Goldstein et al. ............. 385/13 |
| 6,600,581 B1 | * | 7/2003 | Fatehi et al. .................... 398/9 |
| 6,621,338 B1 | * | 9/2003 | Van Schyndel ............. 330/129 |
| 6,650,803 B1 | * | 11/2003 | Ramaswami et al. .......... 385/17 |
| 2002/0114035 A1 | * | 8/2002 | Graves et al. .............. 359/128 |
| 2002/0135840 A1 | * | 9/2002 | Spagnoletti et al. ........ 359/128 |

OTHER PUBLICATIONS

Li, Chung–Sheng and Ramaswami, Rajiv, "Automatic Fault Detection, Isolation, and Recovery in Transparent All–Optical Networks," Journal of Lightwave Technology, vol. 15, No. 10, Oct. 1997.

Chan, Chun–Kit; Kong, Eddie; Tong, Frank; Chen, Lian–Kuan, "A Novel Optical–Path Supervisory Scheme for Optical Cross Connects in All–Optical Transport Networks," IEEE Photonics Technology Letters, vol. 10, No. 6, Jun. 1998.

Hamazumi, Yoshiyki and Koga, Masafumi, "Transmission Capacity of Optical Path Overhead Transfer Scheme Using Pilot Tone for Optical Path Network," Journal of Lighwave Technology, vol. 15, No. 12, Dec. 1997.

Lin, Lih Y.; Goldstein, Evan L.; and Lunardi, Leda M., "Integrated Signal Monitoring and Connection Verification in MEMS Optical Crossconnects," IEEE Photonics Technology Letters, vol. 12, No. 7, Jul. 2000.

* cited by examiner

Primary Examiner—Leslie Pascal
Assistant Examiner—David Payne
(74) Attorney, Agent, or Firm—Ritter, Lang & Kaplan LLP

(57) ABSTRACT

Systems and methods for reliable and low cost optical connection verification. One application is verification and monitoring of optical cross-connect performance. A connection is verified by splitting off optical signals at both ports of the connection, converting the signals to electrical signals, and then cross-correlating to verify connectivity between the ports. Lowpass filtering applied to the electrical signals may be applied to reduce the complexity of the cross-correlation.

25 Claims, 4 Drawing Sheets

CONNECTION VERIFICATION FOR ALL-OPTICAL CROSS-CONNECTS BY SIGNAL CROSS-CORRELATION

BACKGROUND OF THE INVENTION

The present invention relates to optical networking and more particularly to verifying optical connections.

Optical cross-connects (OXCs) are an important building block in realizing the goal of all-optical networks. By definition, optical cross-connects do not involve conversion to electrical signals and regeneration of optical signals. They provide extremely high throughput to accommodate mass broadband access to multi-media applications. Optical cross-connects are highly advantageous in DWDM (dense wave division multiplexing) systems where multiple wavelengths share the same fiber. Furthermore, optical cross-connects readily accommodate mixing of optical signals that are disparate in their framing structures and/or data rates.

An optical cross-connect system includes a plurality of input ports, a plurality of output ports, and a switching fabric capable of connecting a selected input port to a selected output port. The path between the selected input port and the selected output port is said to be transparent because there is no conversion to electrical signals. The switching fabric may incorporate micro-electro-mechanical system (MEMS) technology. The MEMS integrated circuit includes rotatable mirrors and other mechanical and optical components.

Optical cross-connects are key components in the service provider networks in which they find application. As such, extremely high reliability is demanded. Correct operation should be monitored continuously and faults should be addressed immediately. One aspect of the continuous monitoring of optical cross-connect performance is verification that the correct input ports and output ports are in fact coupled together. Connection verification is an important requirement in providing what is now known as "carrier class reliability."

Various approaches to the problem of verifying optical cross-connections have been studied. One possible approach is to examine marker data on the optical signals at the two ports that are supposed to be connected to verify that this marker data is in fact the same. For example, if the optical cross-connect is relaying SONET data, one can make use of the path tracing bytes in the SONET frame structure for this purpose.

Insertion of the necessary marker, however, requires optical-electrical-optical (O/E/O) regeneration at both the input and output port to insert and extract the marker. This, however, goes against one of the principle reasons for using the optical cross-connect, namely, the removal of the need for regeneration. Furthermore, this technique cannot be readily applied to DWDM signals which carry multiple payload signals. This technique also cannot perform verification where the optical cross-connect carries multiple signals with disparate data formats.

Another solution is to modulate the signals incident at the input ports to the cross-connect with a pilot tone and check pilot tone content at the output port to verify connectivity. The pilot tone could be inserted at client equipment that originates the optical signal or such modulation could be provided as a part of the cross-connect using opto-electronic devices such as $LiNbO_3$ optical modulators. Again, there are numerous drawbacks. If the modulation function is performed at the client side, it will be difficult to coordinate appropriate pilot tone content among multiple clients. If the opto-electronic equipment is included at the cross-connect, the expense of the cross-connect will increase dramatically. Another problem is that applying the pilot tone within the cross-connect will modify characteristics of the optical channel, possibly degrading the optical signal to an unacceptable degree. Such degradation is particularly disadvantageous if the cross-connect path is part of a long span without regeneration.

It is also possible to add a tag optical signal at a different wavelength at the selected input port and then verify the presence of the tag optical signal at the output port. The tag signal can then be removed at the output port. As with the pilot signal technique, many additional lasers and detectors are required, increasing expense and actually reducing reliability.

Other solutions relate to incorporating monitoring circuitry on the MEMS chip itself. The disadvantage here is that the reliability of the connection verification process is then no greater than the reliability of the component whose failure is to be monitored.

What is needed is an optical cross-connection verification technique that achieves high reliability with minimal cost, and that does not compromise the performance of the optical cross-connect system.

SUMMARY OF THE INVENTION

Systems and methods for reliable and low cost optical connection verification are provided by virtue of one embodiment of the present invention. One application is verification and monitoring of optical cross-connect performance. A connection is verified by splitting off optical signals at both ports of the connection, converting the signals to electrical signals, and then cross-correlating the electrical signals to verify connectivity between the ports. Lowpass filtering applied to the electrical signals may be applied to reduce the complexity of the cross-correlation.

According to a first aspect of the present invention, a method for verifying an optical connection between a first port and a second port includes: converting a portion of an optical signal at the first port to a first electrical signal, converting a portion of an optical signal at the second port to a second electrical signal, and generating a cross-correlation based on the first electrical signal and the second electrical signal.

According to a second aspect of the present invention, apparatus for verifying an optical connection between a first port and a second port includes: a first input accepting a first electrical signal derived by detection of an optical signal obtained from the first port, a second input accepting a second electrical signal derived by detection of an optical signal obtained from the second port, and a cross-correlation block that generates a cross-correlation signal based on the first electrical signal and the second electrical signal.

According to a third aspect of the present invention, a system for selectively cross-connecting optical lines includes: a plurality of optical input ports, a plurality of optical output ports, an optical switching fabric responsive to a control signal specifying a selected input port of the plurality of input ports to be connected to a selected output port of the plurality of output ports. The optical switching fabric provides a purely optical connection between the selected input port and the selected output port. The system further includes a first detector that converts a portion of an optical signal at the selected input port to a first electrical signal, a second detector that converts a portion of an optical signal at the selected output port to a second electrical signal, and a cross-correlation block that generates a cross-correlation signal based on the first electrical signal and the second electrical signal.

Further understanding of the nature and advantages of the inventions herein may be realized by reference to the remaining portions of the specification and the attached drawings.

DESCRIPTION OF SPECIFIC EMBODIMENTS

The present invention provides system and methods for verifying optical connections. The discussion herein will focus on a particular application, monitoring and verification of optical cross-connects. The invention, however, is not limited to this environment and finds application in e.g., any system for verifying optical connections.

Figure 1:
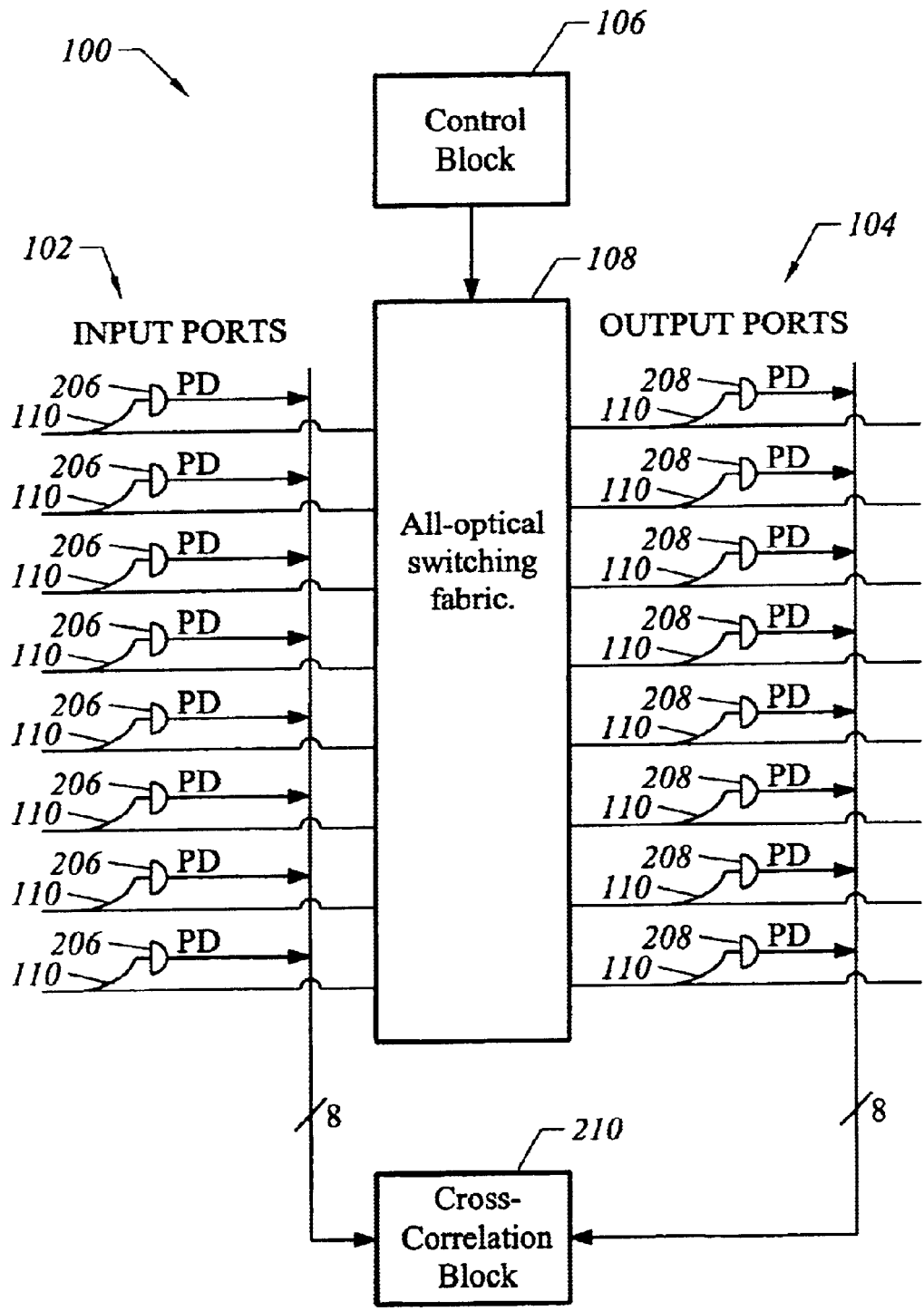
FIG. 1 depicts an optical cross-connection system according to one embodiment of the present invention.

FIG. 1 depicts an all-optical cross-connection system 100 according to one embodiment of the present invention. Cross-connection system 100 provides connectivity between a plurality of input ports 102 and a plurality of output ports 104. Any one of input ports 102 may be selectively coupled to any one of output ports 104 such that there will be transparency between the selected input port and the selected output port. The path through cross-connection system 100 is purely optical and does not involve regeneration of the optical signal following conversion to electrical form. At any one time, multiple pairs of input port and output port may be connected in this manner. Cross-connect system 100 is depicted as interconnecting eight input ports and eight output ports but any number of input ports and output ports may be accommodated according to the present invention.

A control block 106 determines which input ports are to be connected to which output ports in accordance with networking protocols that are not relevant to the operation to the present invention. The switching function is performed by an all-optical switching fabric 108. Switching fabric 108 is e.g., a MEMS integrated circuit that uses adjustable mirrors to guide light from the desired input port to the desired output port. A representative switching fabric is the PDS-002 model available from OMM, Inc. of San Diego, Calif. Any suitable technology may be used to implement switching fabric 108.

According to the present invention, one may verify connectivity between any selected input port and any selected output port. This is important in assuring proper operation of cross-connect system 100 and achieving the high reliability that is needed in service provider applications. According to the present invention, this may be achieved by cross-correlating electrical signals derived from the optical signals present at the relevant input port and output port.

Figure 2:
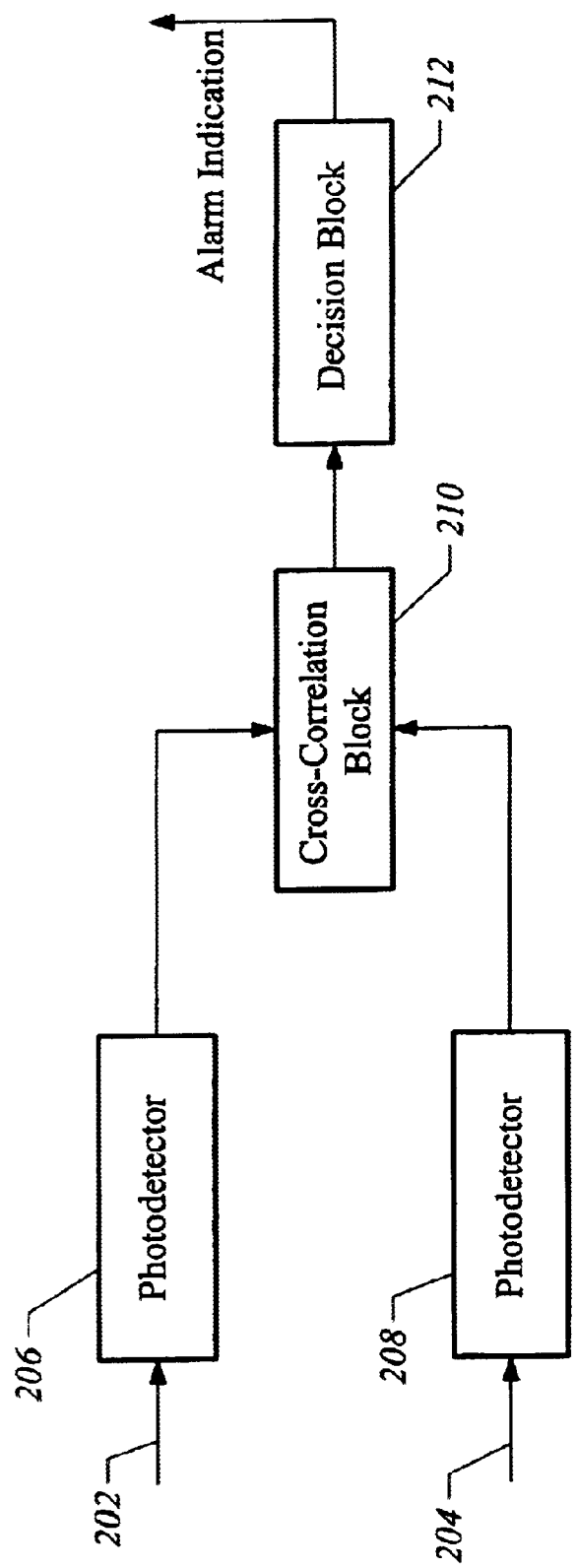
FIG. 2 is a block diagram of an optical connection verification system according to one embodiment of the present invention.

FIG. 2 depicts the overall verification scheme. Optical lines 202 and 204 carry optical signals obtained from the input port and output port respectively. Photodetectors 206 and 208 converts these optical signals to electrical signals.

A cross-correlation block 210 performs a cross-correlation on the two electrical signals as known in the art. Mathematically speaking, the cross correlation of two signals $x_1(t)$ and $x_2(t)$ is:

$$\int x_1(\tau) x_2(t+\tau) d\tau$$

If the two signals are strongly correlated, there will be a high cross-correlation value at a value of t equivalent to the delay between the input port and output port. Thus, one will see a peak of the cross correlation signal at this delay value. If this peak is absent, it indicates, that the signals are not identical and suggests that there is in fact no connection between the input port and output port. The cross-correlation signal is fed into a decision block 212. Decision block 212 monitors the cross-correlation signal for this peak. If the characteristics of the cross-correlation signal indicates that there is in fact no connection, an alarm indication is generated and forwarded to a higher-level network management protocol.

The elements depicted in FIG. 2 will be discussed in greater detail below. It will be appreciated that the connection verification mechanism presented in FIG. 2 will apply to any optical connection verification application and not just to verifying the correct operation of optical cross-connects.

Referring again to FIG. 1, it will be seen how the cross-connection verification scheme of FIG. 2 is implemented in the context of cross-connect system 100. For each of input ports 102 and output ports 104, there is a tap coupler 110 that taps off a portion of the optical signal present at the port for monitoring purposes. In one embodiment, tap couplers 110 are 5/95 tap couplers that tap off 5% of the optical power for monitoring purposes. A representative part that may be employed here is the L2SEWF15A05 5/95 tap coupler from JDS Uniphase.

The photodetector outputs are coupled to cross correlation block 210. In one embodiment, cross-correlation block 210 selects a particular input port and output port for testing and those particular photodetector outputs are selected for cross-correlation. Depending on network management requirements and the overall monitoring scheme, airs of input ports and output ports may be tested in any sequence.

One advantage provided by the verification system of the present invention is that in large part it takes advantage of components that may already be included within cross-connect system 100 for other purposes. Typically, tap couplers 110 and photodetectors 206 are already present due to the need to test and monitor the insertion loss through switching fabric 108. The outputs of photodetectors 206 and 208 are used to determine input optical power and output optical power and therefore verify that the insertion loss is remaining within a specified range.

Figure 3:
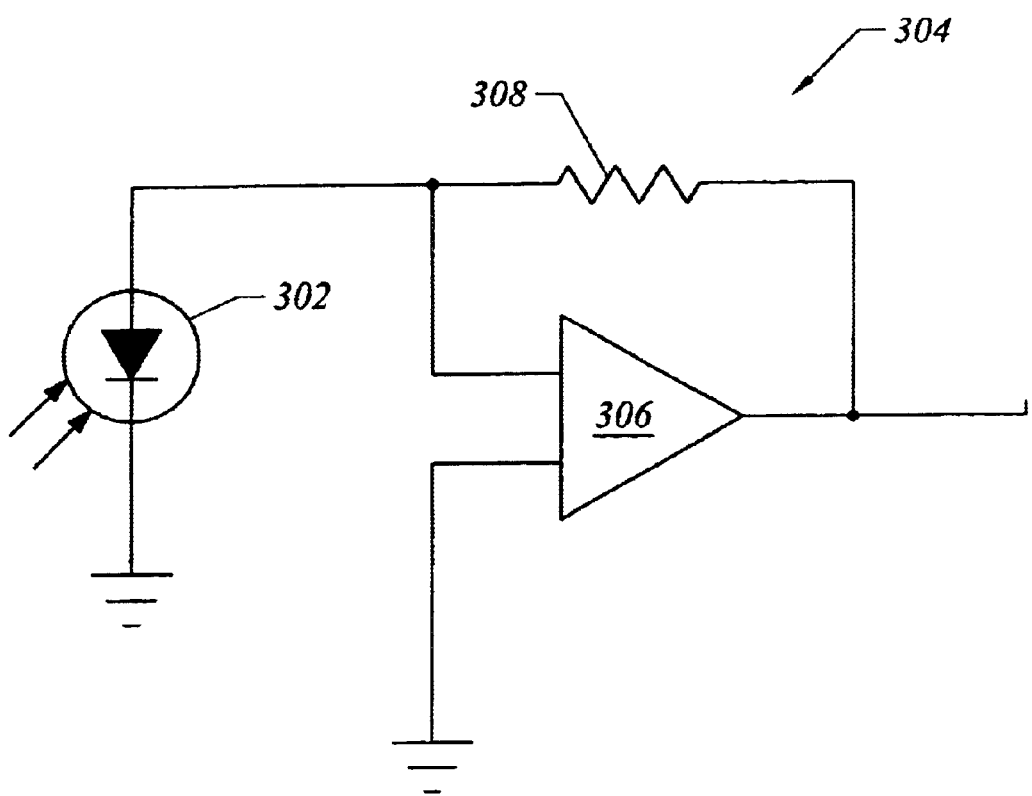
FIG. 3 depicts a photodetection circuit according to one embodiment of the present invention.

FIG. 3 depicts a photodetector circuit as is used in one embodiment of the present invention. A photodiode 302 is coupled to the tap port of tap coupler 110. In one embodiment, photodiode 302 is an EPMG05 EPITAXX InG 1.3–1.6 $\mu$M photodiode available from JDS Uniphase. The output of photodiode 302 is coupled to a transimpedance amplifier 304. Transimpedance amplifier 304, in one embodiment, incorporates an OPA 627 operational amplifier 306 available from Burr-Brown. A suitable resistor value may be selected for a resistor 308 which sets the gain of transimpedance amplifier 304.

Figure 4:
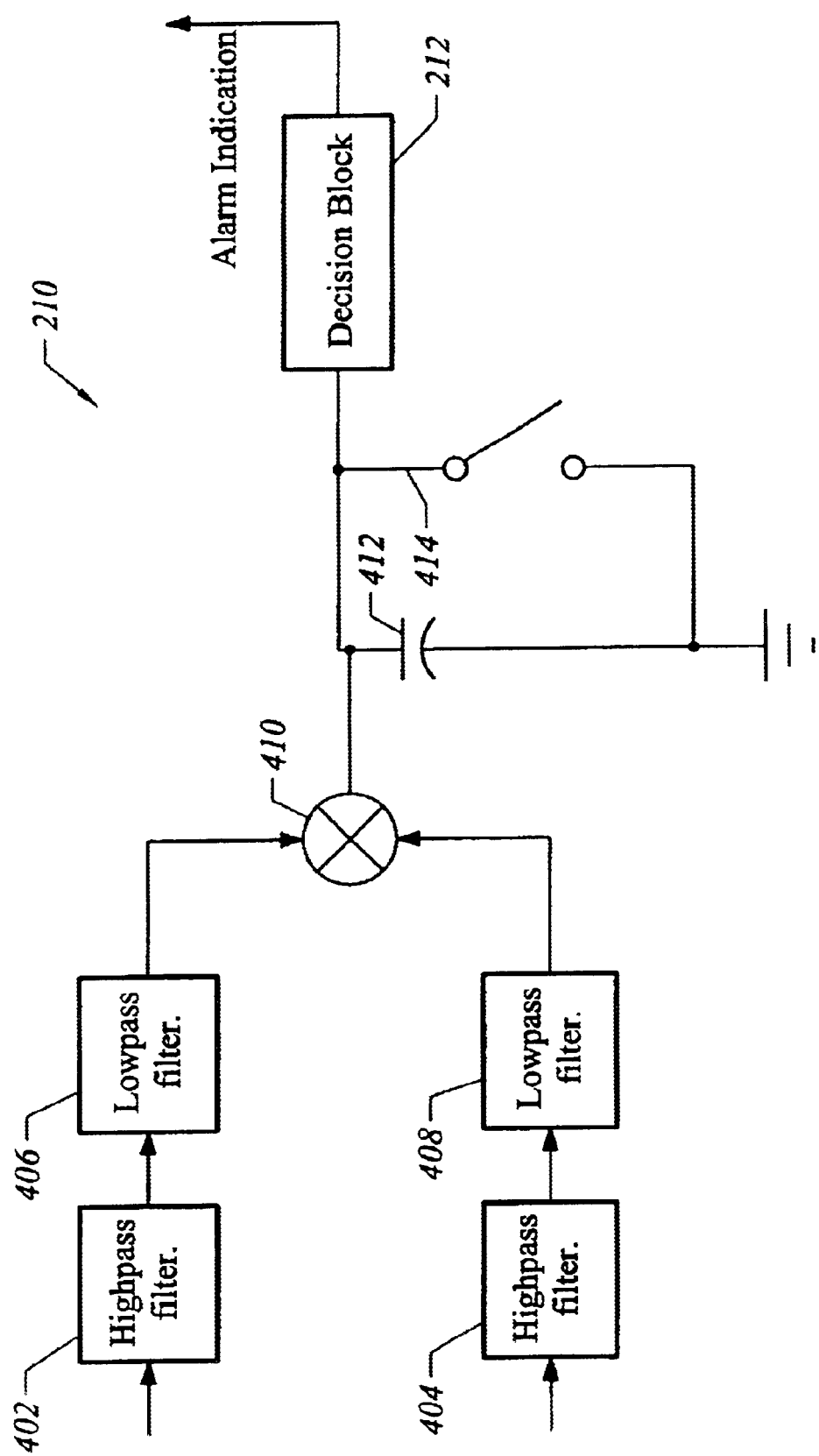
FIG. 4 depicts circuitry for cross-correlation according to one embodiment of the present invention.

FIG. 4 depicts decision block 212 as well as further details of cross-correlation block 210. Due to the extremely high data rate of the payload data carried by typical optical signals, it can be expected that there will be spectral content from near DC to above 10 GHz. The peak of the cross correlation signal, as explained above, will be found at a time T equivalent to the delay across the optical switching fabric. To find the value of the cross-correlation signal at this value T will require buffering T seconds worth of samples of the input signal. In accordance with the well-known Nyquist theorem, accurate digital sampling of analog signals requires a sampling rate double the frequency of the highest frequency spectral component of the analog signal. Thus, an accurate cross-correlation usable for optical connection verification would require buffering an extremely large number of samples at great cost in electronic hardware.

Insight into the characteristics of the optical signals present at the input and output ports has led to a great simplification in the hardware required to perform the cross-correlation. According to one embodiment of the present invention, the need for this buffering is eliminated by filtering out a substantial portion of the spectral content of the electrical representations of the optical signals. It has been found that by filtering these signals to attenuate components above 10 MHz, the need for buffering is eliminated but sufficient signal content is preserved for accurate verification of connectivity. The cross-correlation can then be performed with relatively low cost analog components.

The output of photodetector 206 is coupled to a highpass filter 402 and similarly the output of photodetector 208 is coupled to a highpass filter 404. Highpass filters 402 and 404 attenuate signal content below 10 KHz. The output of highpass filters 402 and 404 is input to lowpass filters 406 and 408. Lowpass filters 406 and 408 attenuate signal content above 10 MHz in one embodiment. In one embodiment, the highpass filters and lowpass filters are consolidated into bandpass filters. An exemplary bandpass filter that may be employed here is the LP-10 bandpass filter available from Mini-Circuits, Inc. This filter has a very flat passband and small variation in cutoff frequency.

The filtered signals are fed to an analog multiplier 410. Analog multiplier 410 implements the cross-correlation. It is not necessary to buffer because eliminating the spectral content above 10 MHz makes the delay of the all-optical switching fabric 108 negligible in comparison to the rate of variation of the filtered signal. In one embodiment, analog multiplier 410 is a component available from Elantec, Inc. Alternatively, an AD734 from Analog Devices, Inc. may be used. This device incorporates lowpass filters 406 and 408 in the same package as the multiplier.

To obtain an indication of a successful connection, the output of multiplier 410 is integrated over time by a capacitor 412. Capacitor 412 is periodically discharged by an MOS switch 414. In one embodiment, capacitor 412 has a capacitance value between 1 $\mu F$ and 10$\mu F$ and the integration period is greater than 10 ms.

If there is a good connection between the input and output ports under test, capacitor 412 will be expected to charge above a threshold V within a time U following the discharge via switch 414. Decision block 212 incorporates a comparator that tests the voltage on capacitor 412 at time U. Alternatively, an analog to digital converter within decision block 212 takes numerous multi-bit samples of the value of the voltage on capacitor 412.

A decision on the state of the optical connection is made based on the output of the comparator or analog to digital converter. In one embodiment, decision block 212 tests that there are a threshold number of samples above threshold V before the closing of switch 414. This indicates that there is in fact a connection. If this test is failed, or failed repeatedly, an alarm indication is generated and forwarded to a network management entity that can then take appropriate steps to ameliorate the fault and/or alert an operator.

Decision block 212 may be implemented in any suitable way. For example, a standard analog to digital converter or comparator circuit can be combined with a (FPGA) or microprocessor that incorporates the decision logic.

It will be appreciated that an optical connection verification scheme has been achieved by the use of low cost components to process signals generated by hardware already needed to measure insertion loss. The verification scheme brings optical cross-connection the reliability needed for deployment in service provider networks.

It is understood that the examples and embodiments that are described herein are for illustrative purposes only and various modifications are changes in light thereof will be suggested to persons skilled in the art and are to be included within the spirit and purview of this application and scope of the appended claims and their full scope of equivalents.

What is claimed is:

1. A method for verifying an optical connection between a first port and a second port, said method comprising:
   converting a portion of an optical signal at said first port to a first electrical signal;
   converting a portion of an optical signal at said second port to a second electrical signal; and
   generating a cross-correlation signal based on said first electrical signal and said second electrical signal including
   filtering out from said first electrical signal components above a first predetermined frequency level;
   filtering out from said second electrical signal components above said first predetermined frequency level,
   multiplying in analog said filtered first electrical signal and said filtered second electrical signal; and
   integrating said multiplied signals with a capacitor to obtain said cross-correlation signal.

2. The method of claim 1 further comprising:
   causing an alarm condition if said connection monitor signal does not indicate a connection.

3. The method of claim 1 wherein said filtering out from first electrical signal substep comprises filtering out components above 10 MHz.

4. The method of claim 1 wherein said cross-correlation signal generation step further includes
   filtering out from said first and second electrical signals components below a second predetermined frequency.

5. The method of claim 4 wherein said filtering out from first and second electrical signals substep comprises filtering out components below 10 KHz.

6. The method of claim 1 wherein said cross-correlation signal generating step further includes discharging said capacitor before said integrating substep, said cross-correlation signal corresponding to a voltage across said capacitor after an integration period.

7. Apparatus for verifying an optical connection between a first port and a second port, said apparatus comprising:
   a first detector that converts a portion of an optical signal at said first port to a first electrical signal;
   a second detector that converts a portion of an optical signal at said second port to a second electrical signal; and
   a cross-correlation block that generates a cross-correlation signal based on said first electrical signal and said second electrical signal, including
   a first lowpass filter which filters out from said first electrical signal components above a first predetermined frequency to form a first lowpass filtered signal; and a second lowpass filter which filters out from said second electrical signal components above said first predetermined frequency to form a second lowpass filtered signal;

an analog multiplier which multiplies said first lowpass filtered signal and said second lowpass filtered signal together; and a capacitor that integrates said multiplied first and second lowpass filtered signals to generate a cross-correlation signal.

8. The apparatus of claim 7 further comprising:

a decision block that generates an alarm indication if said cross-correlation signal does not indicate a connection between said first port and said second port.

9. The apparatus of claim 7 wherein said first predetermined frequency comprises 10 MHz.

10. The apparatus of claim 7 said cross-correlation block further includes a first highpass which filters out from said first electrical signal components below a second predetermined frequency; and a second highpass which filters out from said second electrical signal components below said second predetermined frequency.

11. The apparatus of claim 10 wherein said second predetermined frequency comprises 10 KHz.

12. The apparatus of claim 7 wherein said cross-correlation block further includes a switch which discharges said capacitor before said capacitor integrates said multiplied first and second lowpass filtered signals, said cross-correlation signal corresponding to a voltage across said capacitor after an integration period.

13. Apparatus for verifying an optical connection between a first port and a second port, said apparatus comprising:

a first input accepting a first electrical signal derived by detection of an optical signal obtained from said first port;

a second input accepting a second electrical signal derived by detection of an optical signal obtained from said second port; and a cross-correlation block that generates a cross-correlation signal based on said first electrical signal and said second electrical signal, including a first lowpass filter which filters out from said first electrical signal components above a first predetermined frequency to form a first lowpass filtered signal; and a second low pass filter which filters out from said second electrical signal components above said first predetermined frequency to form a second lowpass filtered signal;

an analog multiplier which multiplies said first lowpass filtered signal and said second lowpass filtered signal together; and a capacitor that integrates said multiplied first and second lowpass filter red signals to generate a cross-correlation signal.

14. The apparatus of claim 13 further comprising:

a decision block that generates an alarm indication if said cross-correlation signal does not indicate a connection between said first port and said second port.

15. The apparatus of claim 13 wherein said first predetermined frequency comprises 10 MHz.

16. The apparatus of claim 13 wherein said cross-correlation block further includes a first highpass filter which filters out from said first electrical signal components below a second predetermined frequency; and a second highpass filter which filters out from said second electrical signal components below said second predetermined frequency.

17. The apparatus of claim 16 wherein said second predetermined frequency comprises 10 KHz.

18. The apparatus of claimed 13 wherein said cross-correlation block further includes a switch which discharges said capacitor before said capacitor integrates said multiplied first and second lowpass filtered signals, said cross-correlation signal corresponding to a voltage across said capacitor after an integration period.

19. A system for selectably cross-connecting optical lines, said system comprising:

a plurality of optical input ports;

a plurality of optical output ports;

an optical switching fabric responsive to a control signal specifying a selected input port from said plurality of input ports to be connected to a selected output port from said plurality of output ports to provide a purely optical connection between said selected input port and said selected output port;

a first detector that converts a portion of an optical signal at said selected input port to a first electrical signal;

a second detector that converts a portion of an optical signal at said selected output port to a second electrical signal; and a cross-correlation block that generates a cross-correlation signal based on said first electrical signal and said second electrical signal, including a first lowpass filter which filters out from said first electrical signal components above a first predetermined frequency to form a first lowpass filtered signal: and a second lowpass filter which filters out from said second electrical signal components above said first predetermined frequency to form a second lowpass filtered signal, an analog multiplier which multiplies said first lowpass filtered signal and said second lowpass filtered signal together, and a capacitor that integrates said multiplied first and second lowpass filtered signals to generate a cross-correlation signal.

20. The system of claim 19 further comprising:

a decision block that generates an alarm indication if said connection monitor signal indicates no connection between said selected input port and said selected output port.

21. The system of claim 19 wherein said first predetermined frequency comprises 10 MHz.

22. The system of claim 19 said cross-correlation block further includes a first highpass filter which filters out from said first electrical signal components below a second predetermined frequency; and a second highpass filter which filters out from said second electrical signal components below said second predetermined frequency.

23. The system of claim 19 wherein said second predetermined frequency comprises 10 KHz.

24. The system of claim 19 wherein said cross-correlation block further includes a switch which discharges said capacitor before said capacitor integrates said multiplied first and second lowpass filtered signals, said cross-correlation signal corresponding to a voltage across said capacitor after an integration period.

25. Apparatus for verifying an optical connection between a first port and a second port, said apparatus comprising:

means for converting a portion of an optical signal at said first port to a first electrical signal;

means for converting a portion of an optical signal at said second port to a second electrical signal;

means for lowpass filtering said first electrical signal and said second electrical signal to form lowpass filtered versions thereof;

analog means for multiplying said lowpass filtered versions of said first electrical signal and second electrical signal together;

means for capacitively integrating said multiplied lowpass filtered versions of said first electrical signal and second electrical signal for generating a cross-correlation signal based on said first electrical signal and said second electrical signal, said cross-correlation signal responsive to an optical connection between said first port and said second port.

* * * * *